US008067325B2

(12) United States Patent
Shimada et al.

(10) Patent No.: US 8,067,325 B2
(45) Date of Patent: Nov. 29, 2011

(54) SEMICONDUCTOR CERAMIC COMPOSITION

(75) Inventors: Takeshi Shimada, Saitama (JP); Kazuya Toji, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 271 days.

(21) Appl. No.: 12/280,738

(22) PCT Filed: Feb. 27, 2007

(86) PCT No.: PCT/JP2007/053679
§ 371 (c)(1),
(2), (4) Date: Aug. 26, 2008

(87) PCT Pub. No.: WO2007/097462
PCT Pub. Date: Aug. 30, 2007

(65) Prior Publication Data
US 2009/0036293 A1    Feb. 5, 2009

(30) Foreign Application Priority Data
Feb. 27, 2006    (JP) .............................. P. 2006-051061

(51) Int. Cl.
*C04B 35/00* (2006.01)
(52) U.S. Cl. ....................................... 501/139; 501/137
(58) Field of Classification Search ........... 501/134–139
See application file for complete search history.

(56) References Cited

U.S. PATENT DOCUMENTS

| | | | | |
|---|---|---|---|---|
| 6,231,779 | B1 * | 5/2001 | Chiang et al. | 252/62.9 R |
| 7,090,785 | B2 * | 8/2006 | Chiang et al. | 252/62.9 R |
| 2009/0219666 | A1 * | 9/2009 | Fukuda | 361/301.4 |

FOREIGN PATENT DOCUMENTS

| | | |
|---|---|---|
| JP | 56-169301 | 12/1981 |
| JP | 11-87108 | 3/1999 |
| JP | 2005-255493 | 9/2005 |
| JP | 2005-255493 A * | 9/2005 |
| WO | WO 2006/106910 | 10/2006 |
| WO | WO 2006/118274 | 11/2006 |

* cited by examiner

*Primary Examiner* — Jerry A Lorengo
*Assistant Examiner* — Noah Wiese
(74) *Attorney, Agent, or Firm* — Stein McEwen, LLP

(57) ABSTRACT

It is intended to provide a semiconductor ceramic composition containing no Pb, which is capable of shifting the Curie temperate to a positive direction as well as of controlling room temperature resistivity and having an excellent jump characteristic. Since the semiconductor ceramic composition in which a portion of Ba of $BaTiO_3$ is substituted by Bi—Na has a crystal in which a central part and an outer shell part of a crystal grain are different from each other in composition, the composition is capable of improving control of room temperature resistivity and a jump characteristic, and therefore it is optimum as a material for a PTC thermistor, a PTC heater, a PTC switch, a temperature detector, and the like.

10 Claims, 5 Drawing Sheets

US 8,067,325 B2

SEMICONDUCTOR CERAMIC COMPOSITION

CROSS-REFERENCE TO RELATED APPLICATIONS

This application claims the benefit of PCT International Patent Application No. PCT/JP2007/053679, filed Feb. 27, 2007, and Japanese Patent Application No. 2006-051061, filed Feb. 27, 2006, in the Japanese Patent Office, the disclosures of which are incorporated herein by reference.

BACKGROUND OF THE INVENTION

1. Field of the Invention

This invention relates to a semiconductor ceramic composition having a positive temperature coefficient of resistivity, which is used for a PTC thermistor, a PTC heater, a PTC switch, a temperature detector, and the like.

2. Description of the Related Art

Conventionally, as materials showing a PTCR characteristic (Positive Temperature Coefficient of Resistivity), there have been proposed compositions in which various semiconductive dopants are added to $BaTiO_3$. These compositions have a Curie temperature around 120° C. Depending on the use, these compositions need to be shifted in Curie temperature.

For example, it has been proposed to shift the Curie temperature by adding $SrTiO_3$ to $BaTiO_3$; however, the Curie temperature is shifted only in a negative direction and is not shifted in a positive direction in this case. Currently, only $PbTiO_3$ is known as an adding element for shifting the Curie temperature in a positive direction. However, since $PbTiO_3$ includes an element that causes environmental pollution, a material which does not use $PbTiO_3$ has been in demand in recent years.

In the $BaTiO_3$ semiconductor porcelain, with an object of preventing a reduction in a temperature coefficient of resistivity by Pb substitution as well as reducing a voltage dependency to promote productivity and reliability, there has been proposed a method of producing a $BaTiO_3$ semiconductor porcelain in which one or more kinds of Nb, Ta, and a rare earth element is added to a composition obtained by using no $PbTiO_3$ and controlling x to a range of $0<x\leq0.15$ in a structure of $Ba_{1-2x}(BiNa)_xTiO_3$ that is achieved by substituting a portion of Ba of $BaTiO_3$ by Bi—Na; followed by sintering the composition in nitrogen; and thereafter subjecting the composition to a heat treatment in an oxidation atmosphere (see Patent Reference 1).

Patent Reference 1: JP-A-56-169301

SUMMARY OF THE INVENTION

Problems that the Invention is to Solve

One of the great features of the PTC materials is the sharp increase in resistivity at the Curie point (jump characteristic=temperature coefficient of resistivity α), and this is considered to be caused due to an increase in resistivity formed at a crystal grain boundary (resistivity by shot key barrier). As to a property of the PTC materials, a PTC material having a high jump characteristic in resistivity has been in demand.

In Patent Reference 1, although a composition obtained by adding 0.1 mol % of $Nd_2O_3$ as a semiconductive dopant is disclosed as one of Examples, when a trivalent positive ion is added as the semiconductive dopant in the case of performing atomic valence control of the composition, the effect of semiconductor formation is deteriorated due to the presence of a monovalent Na ion. Therefore, a problem of an increase in room temperature resistivity is raised.

As described above, among the PTC materials containing no Pb such as that disclosed in Patent Reference 1, those having excellent jump characteristic tends to have high room temperature resistivity, while those having inferior jump characteristic tends to have too low room temperature resistivity, thereby posing a problem that it is difficult to achieve both of stable room temperature resistivity and excellent jump characteristic.

An object of this invention is to provide a semiconductor ceramic composition containing no Pb, which is capable of shifting the Curie temperate to a positive direction as well as of controlling room temperature resistivity and having an excellent jump characteristic.

Means for Solving the Problems

As a result of intensive studies for attaining the above-described object, the inventors found that, in a semiconductor ceramic composition in which a portion of Ba in $BaTiO3$ is substituted by Bi—Na, a grain boundary level is increased by partially varying a composition in a crystal grain, thereby making it possible to increase resistivity formed at a crystal grain boundary, i.e. an amount of shot key barrier formation, as well as to improve the jump characteristic along with the increase in shot key barrier formation amount.

Further, the inventors found that it is possible to change the composition in the crystal grain and the state of the crystal grain boundary by adjusting a production method, whereby it is possible to change the amount of shot key barrier formation to improve control of room temperature resistivity and a jump characteristic, thereby accomplishing this invention.

This invention provides a semiconductor ceramic composition in which a portion of Ba of $BaTiO3$ is substituted by Bi—Na, wherein the semiconductor porcelain composition contains a crystal wherein a central part and an outer shell part of a crystal grain are different from each other in composition.

This invention proposes, in the above-described structure, a structure wherein the central part and the outer shell part of the crystal grain are different from each other in Bi—Na concentration, a structure wherein the Bi—Na concentration in the crystal grain is increased from the central part to the outer shell part, and a structure wherein the central part and the outer shell part of the crystal grain are different from each other in ratio between Bi and Na.

This invention proposes a semiconductor ceramic composition in which a portion of Ba of $BaTiO3$ is substituted by Bi—Na, wherein the semiconductor ceramic composition contains a crystal wherein a central part and an outer shell part of a crystal grain are different from each other in Bi—Na concentration or ratio between Bi and Na; and a plurality of the crystal grains different in the Bi—Na concentration or the ratio between Bi and Na in the outer shell part are bound to each other to form a crystal grain boundary.

As a specific example of a semiconductor ceramic composition in which a portion of Ba of $BaTiO3$ is substituted by Bi—Na, the semiconductor ceramic composition containing a crystal wherein a central part and an outer shell part of a crystal grain are different from each other in composition, this invention proposes a structure represented by a composition formula of $[(BiNa)_x(Ba_{1-y}R_y)_{1-x}]TiO3$ (wherein R is at least one kind of rare earth elements), wherein x and y each satisfy $0<x\leq0.2$ and $0<y\leq0.02$; or a structure represented by a composition formula of $[(BiNa)_xBa_{1-x}][Ti_{1-z}M_z]O3$ (wherein M is at least one kind of Nb, Ta, and Sb), wherein x and z each satisfy $0 < x \leqq 0.2$ and $0 < z \leqq 0.005$.

ADVANTAGE OF THE INVENTION

According to this invention, it is possible to provide a semiconductor ceramic composition which is capable of shifting the Curie temperature to a positive direction without using Pb causing environmental pollution as well as of controlling room temperature resistivity and having an excellent jump characteristic.

Further, the semiconductor ceramic composition according to this invention has an advantage of less subject to thermorunaway since the composition has a resistivity peak value to a high temperature side as compared to conventional PTC elements containing PbTiO3.

DETAILED DESCRIPTION OF THE EMBODIMENTS

Figure 1:
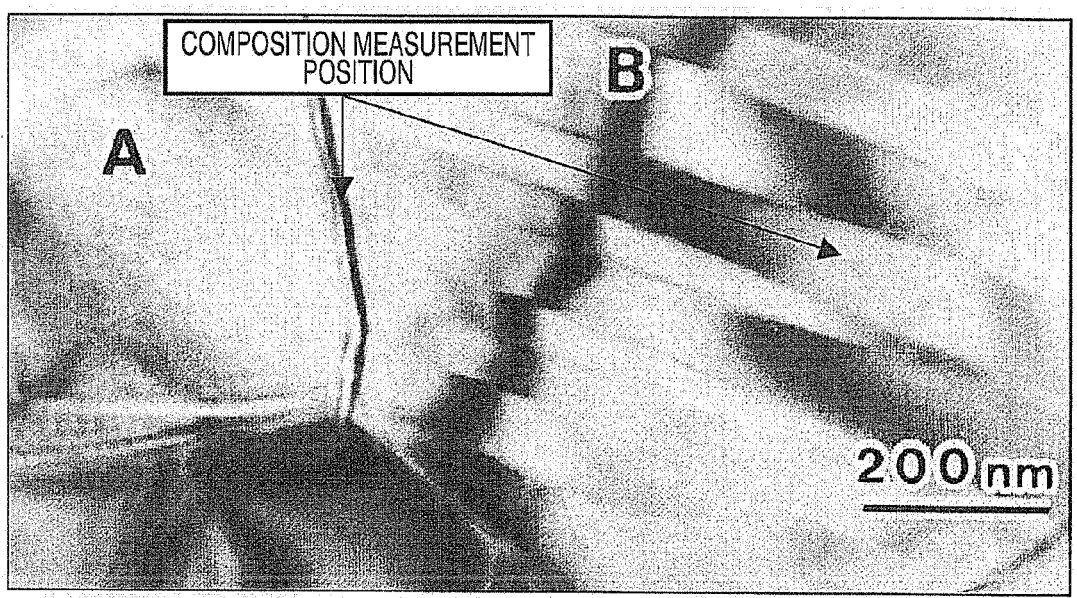
FIG. 1 is a diagram showing a composition measurement position in a crystal grain.

In a semiconductor ceramic composition in which a portion of Ba of $BaTiO_3$ is substituted by Bi—Na, by partially varying the compositions of crystal grains, an amount of shot key barrier formation is increased to thereby improve a jump characteristic. As the composition in which the compositions of crystal grains are partially different, compositions having the following structures are preferred.

(1) A structure in which compositions of a central part and an outer shell part of a crystal grain are different from each other.

A structure is made so that the composition of the central part and the composition of the outer shell part are different from each other in the crystal grain in each of crystals in the semiconductor ceramic composition.

(2) A structure according to the structure (1), in which Bi—Na concentrations as the compositions are different from each other.

A structure is made so that the Bi—Na concentration of the central part and the Bi—Na concentration of the outer shell part are different from each other in the crystal grain in each of crystals in the semiconductor ceramic composition. In this case, a ratio between Bi and Na (Bi/Na) in the central part and a ratio between Bi and Na (Bi/Na) in the outer shell part may be identical with each other.

(3) A structure according to the structure (2), in which a Bi—Na concentration is gradually increased from a central part to an outer shell part in a crystal grain.

As in the structure (2), a ratio between Bi and Na (Bi/Na) in the central part and a ratio between Bi and Na (Bi/Na) in the outer shell part may be identical with each other in this case.

(4) A structure according to the structure (1), in which ratios between Bi and Na as the compositions are different from each other.

A structure is made so that the ratio between Bi and Na (Bi:Na) in the central part and the ratio between Bi and Na in the outer shell part are different from each other in the crystal grain in each of crystals in the semiconductor ceramic composition. In this case, a total amount of Bi and Na in the central part and a total amount of Bi and Na in the outer shell part may be identical with each other.

In the structures (1) to (4), as a preferred embodiment, there may be mentioned a structure in which a Bi concentration in the central part in the crystal grain is 1 mol % or less and a Bi concentration in the outer shell part in the crystal grain is 1 mol % or more; or a structure in which a ratio between the Bi concentrations in the central part and the outer shell part (central part/outer shell part) is 1/2.5 or more. Note that the preferred embodiment varies depending on the component ranges and the like of the composition.

(5) A structure according to the structure (2) or (3), in which a plurality of crystal grains having different Bi—Na concentrations in the outer shell parts are bound to each other to form a crystal grain boundary.

A structure is made so that the Bi—Na concentration in the central part and the Bi—Na concentration in the outer shell part are different from each other in the crystal grain in each of crystals in the semiconductor ceramic composition, and a plurality of the crystal grains having different Bi—Na concentrations in the outer shell parts are bound to each other to form a crystal grain boundary. The crystal grain boundary in this structure serves as a shot key barrier, and an amount of the shot key formation is increased due to the different Bi—Na concentrations in the bound crystal grains, thereby improving the jump characteristic.

(6) A structure according to the structure (4), in which a plurality of crystal grains having different ratios between Bi and Na in the outer shell parts are bound to each other to form a crystal grain boundary.

A structure is made so that the ratio between Bi and Na in the central part and the ratio between Bi and Na in the outer shell part are different from each other in the crystal grain in each of crystals in the semiconductor ceramic composition, and a plurality of the crystal grains having different ratios of Bi and Na in the outer shell parts are bound to each other to form a crystal grain boundary. The crystal grain boundary in this structure serves as a shot key barrier, and an amount of the shot key formation is increased due to the different ratios between Bi and Na in the bound crystal grains, thereby improving the jump characteristic.

Although it is possible to use any composition in which a portion of Ba of $BaTiO_3$ is substituted by Bi—Na as the semiconductor ceramic composition according to this invention, it is possible to enhance the effects of improving room temperature resistivity and jump characteristic according to this invention when a composition is represented by a composition formula of $[(BiNa)_x(Ba_{1-y}R_y)_{1-x}]TiO_3$ (wherein R is at least one kind of rare earth elements), wherein x and y each satisfy $0 < x \leqq 0.2$ and $0 < y \leqq 0.02$; or a composition formula of $[(BiNa)_xBa_{1-x}][Ti_{1-z}M_z]O_3$ (wherein M is at least one kind of Nb, Ta, and Sb), wherein x and z each satisfy $0 < x \leqq 0.2$ and $0 < z \leqq 0.005$, since such compositions make it possible to increase the Curie temperature as well as to reduce room temperature resistivity without using Pb.

In the $[(BiNa)_x(Ba_{1-y}R_y)_{1-x}]TiO_3$ composition, R is at least one kind of rare earth elements, and La is most preferred. In the composition formula, x represents a component range of (BiNa), and a preferred range thereof is $0<x\leqq0.2$. It is impossible to shift the Curie temperature to the high temperature side when x is 0, while room temperature resistivity undesirably approaches to $10^4$ Ωcm when x exceeds 0.2 to make it difficult to apply the composition to a PTC heater and the like.

In the composition formula, y represents a component range of R, and a preferred range thereof is $0<y\leqq0.02$. The composition is not formed into a semiconductor when y is 0, while room temperature resistivity becomes undesirably large when y exceeds 0.02. Atomic valence control is performed by changing the value of y, but, in the case of performing atomic valence control of composition in a system wherein a portion of Ba is substituted by Bi—Na, there is a problem that the effect of forming semiconductor is deteriorated due to the presence of a monovalent Na ion when a trivalent positive ion is added as a semiconductive dopant, thereby increasing room temperature resistivity. Therefore, a more preferred range thereof is $0.002\leqq y\leqq0.02$. The range $0.002\leqq y\leqq0.02$ is 0.2 mol % to 2.0 mol % in terms of mol %. In Patent Reference 1 mentioned above, although 0.1 mol % of $Nd_2O_3$ is added as a semiconductor element, it is considered that semiconductor formation sufficient for use in PTC is not realized in that case.

In the $[(BiNa)_xBa_{1-x}][Ti_{1-z}M_z]O_3$ composition, M is at least one kind of Nb, Ta, and Sb, and Nb is preferred among others. In the composition formula, x represents a component range of Bi and Na, and a preferred range thereof is $0<x\leqq0.2$. It is impossible to shift the Curie temperature to the high temperature side when x is 0, while room temperature resistivity undesirably approaches to $10^4$ Ωcm when x exceeds 0.2 to make it difficult to apply the composition to a PTC heater and the like.

In the composition formula, z represents a component range of M, and a preferred range thereof is $0<z\leqq0.005$. It is impossible to form the composition into a semiconductor due to a failure in atomic valence control when z is 0, while room temperature resistivity undesirably exceeds $10^3$ Ωcm when z exceeds 0.05. The range $0<z\leqq0.005$ is 0 mol % to 0.5 mol % (excluding 0) in terms of mol %.

In the case of the $[(BiNa)_xBa_{1-x}][Ti_{1-z}M_z]O_3$ composition, Ti is substituted by M element in order to perform the atomic valence control, and, since the addition of M element (addition amount: $0<z\leqq0.005$) is targeted on the atomic valence control of a Ti site which is a tetravalent element in this case, it is possible to perform the atomic valence control with the use of R element in an amount less than the preferred addition amount ($0.002\leqq y\leqq0.02$) in the $[(BiNa)_x(Ba_{1-y}R_y)_{1-x}]TiO_3$ composition in which R is used as the semiconductive dopant. Thus, this composition has an advantage of alleviating internal distortion of the semiconductor ceramic composition according to this invention.

In both of the $[(BiNa)_x(Ba_{1-y}R_y)_{1-x}]TiO_3$ composition and the $[(BiNa)_xBa_{1-x}][Ti_{1-z}M_z]O_3$ composition, the ratio between Bi and Na is basically 1/1. As a composition formula, the ratio is expressed as $[(Bi_{0.5}Na_{0.5})_x(Ba_{1-y}R_y)_{1-x}]TiO_3$ and $[(Bi_{0.5}Na_{0.5})_xBa_{1-x}][Ti_{1-z}M_z]O_3$. These formulas represent a composition as the whole composition, and, as described above, the Bi—Na contents or ratios in crystals may be different from each other as well as the Bi—Na contents or ratios in the central part and the outer shell part may be different from each other in each of crystal grains.

The ratio between Bi and Na in each of the compositions is basically set to 1/1 since the ratio between Bi and Na can be fluctuated due to evaporation of Bi in a calcining step, for example. That is to say, a case in which the ratio between Bi and Na in preparation is 1/1 but deviates from 1/1 in a sintered material is also included in this invention.

In order to obtain the semiconductor ceramic composition according to this invention, it is necessary to partially vary the composition in the crystal grain. Ordinary production methods of semiconductor ceramic composition include steps of preparation of raw material powders, mixing, calcining, crushing, forming, and sintering, but since the conditions for obtaining a composition having uniform compositions are selected in these methods, it is impossible to obtain the semiconductor ceramic composition of this invention according to these methods.

That is to say, it is necessary to perform the production under the conditions for not forming the uniform compositions or by employing a method different from the ordinary production methods. One example of production method for obtaining the semiconductor ceramic composition according to this invention will hereinafter be described.

(a) Changing heat treatment conditions.

For instance, a reduction in calcination temperature, a reduction in calcining time, a change in temperature increase rate before reaching a calcination temperature, a change in temperature reduction rate after the calcination, and the like may be mentioned. That is, the conditions for obtaining a uniform solute material are slightly changed.

(b) Bi and/or Na is/are added after calcination followed by mixing, crushing, forming, and sintering.

For instance, after producing a calcined material by an ordinary production method, a small amount of $Bi_2O_3$ and/or $Na_2CO_3$ is/are added to the calcined material, followed by mixing, crushing, molding, and sintering. Alternatively, after producing a $BaTiO_3$ calcined material by blending, mixing, and calcining only $BaCO_3$ and $TiO_2$ excluding Bi and Na, $Bi_2O_3$ and/or $Na_2CO_3$ is/are added to the calcined material, followed by mixing, crushing, forming, and sintering. At this time, $Bi_2O_3$ and/or $Na_2CO_3$ is/are prevented from being entirely dispersed into the $BaTiO_3$ solute by adjusting a sintering temperature and a sintering time. It is possible to employ the method (a) in combination at the stage of calcining.

(c) After separately preparing a $(BaQ)TiO_3$ calcined powder (Q means a semiconductive dopant) and a $(BiNa)TiO_3$ calcined powder, the powders are mixed, followed by forming and sintering.

According to this method, compositions in both calcined powders migrate during the sintering, whereby a crystal in which a composition in a crystal grain is partially varied is obtained. Also, according to this method, it is possible to suppress Bi evaporation; reduce room temperature resistivity by suppressing generation of a secondary phase containing Na due to prevention of composition shift of Bi—Na; and suppress a fluctuation in Curie temperature.

The production method according to (c) was newly found by the inventors. Hereinafter, details of the method will be described.

An feature of the production method according to (c) is such that the $(BaQ)TiO_3$ calcined powder (Q means a semiconductive dopant) and the $(BiNa)TiO_3$ calcined powder are separately prepared, followed by mixing, forming, and sintering. In a step of preparing the $(BaQ)TiO_3$ calcined powder (Q means a semiconductive dopant), $BaCO_3$, $TiO_2$, and a raw material powder of the semiconductive dopant such as $La_2O_3$ and $Nb_2O_5$ are mixed to obtain a mixed raw material powder, followed by calcining. A calcination temperature may preferably be within the range of 900° C. to 1300° C., and a calcining time may preferably be 0.5 hour or more. When the calcination temperature is less than 900° C. or when the calcining time is less than 0.5 hour, (BaQ)TiO$_3$ is not formed perfectly to cause a part of BaO decomposed from BaCO$_3$ to react with water and the remaining part of BaCO$_3$ to be dissolved into water, thereby undesirably causing the composition shift. Further, when the calcination temperature exceeds 1300° C., a sintered part is formed in the calcined powder to undesirably prevent the calcined powder from being dissolved into the (BiNa)TiO$_3$ calcined powder.

In a step of preparing the (BiNa)TiO$_3$ calcined powder, a mixed raw material powder is prepared by mixing raw material powders of Na$_2$CO$_3$, Bi$_2$O$_3$, and TiO$_2$. When an excessive amount (exceeding 5 mol %, for example) of Bi$_2$O$_3$ is added, a secondary phase is generated during the calcining, thereby undesirably increasing room temperature resistivity. Subsequently, the mixed raw material powder is calcined. A calcination temperature may preferably be within the range of 700° C. to 950° C., and a calcining time may preferably be 0.5 to 10 hours. When the calcination temperature is less than 700° C. or the calcining time is less than 0.5 hour, a non-reacted Na$_2$CO$_3$ or NaO generated by decomposition reacts with an ambient moisture or a solvent in the case of wet drying, thereby undesirably cause a composition shift or a fluctuation in characteristics. Further, when the calcination temperature exceeds 950° C. or the calcining time exceeds 10 hours, Bi evaporation is progressed to cause the composition shift, thereby undesirably promoting generation of a secondary phase.

Note that an optimum temperature for each of the preferred calcination temperature (900° C. to 1300° C.) in the step of preparing the (BaQ)TiO$_3$ calcined powder and the calcination temperature (700° C. to 950° C.) in the step of preparing the (BiNa)TiO$_3$ calcined powder may preferably be selected in accordance with usage and the like. For example, the calcination temperature of (BaQ)TiO$_3$ may preferably be adjusted to a relatively low temperature by adjusting the calcining time or the like for the purpose of achieving sufficient reaction while preventing Bi evaporation. Further, the calcination temperature of (BiNa)TiO$_3$ may preferably be lower than the calcination temperature of (BaQ)TiO$_3$.

In each of the steps of preparing the calcined powders, crushing may be performed depending on a grain size of the raw material powders when mixing the raw material powders. Also, the mixing and crushing may be either one of wet mixing/crushing using a pure water or ethanol or dry mixing/crushing, but the dry mixing/crushing is preferred since it is possible to more reliably prevent the composition shift. Although BaCO$_3$, Na$_2$CO$_3$, TiO$_2$, and the like are described as examples of the raw material powders, other Ba compounds, Na compounds, and the like may be used.

After separately preparing the (BaQ)TiO$_3$ calcined powder and the (BiNa)TiO$_3$ calcined powder as described above, the calcined powders are compounded in predetermined amounts, followed by mixing. The mixing may be either one of wet mixing using a pure water or ethanol or dry mixing, but the dry mixing is preferred since it is possible to more reliably prevent the composition shift. Depending on grain sizes of the calcined powders, crushing may be performed after the mixing or simultaneously with the mixing. An average grain size of the mixed calcined powder after the mixing and crushing may preferably be 0.5 μm to 2.5 μm.

When 3.0 mol % or less of Si oxide or 4.0 Mol % or less of Ca oxide or Ca carbonate are added in the step of preparing the (BaQ)TiO$_3$ powder and/or the step of preparing the (BiNa)TiO$_3$ powder or the step of mixing the calcined powders, the Si oxide favorably suppresses abnormal growth of crystal grains and enables easy control of resistivity, and the Ca oxide or the Ca carbonate favorably improves a sintering property at a low temperature. In any case, the composition undesirably fails to exhibit a semiconductor forming property when they are added in amounts exceeding the above-specified upper limits. The addition may preferably be performed before mixing in each step.

The mixed calcined powder obtained by the step of mixing the (BaQ)TiO$_3$ calcined powder and the (BiNa)TiO$_3$ calcined powder is formed by a desired forming means. A crushed powder may be optionally granulated by using a granulator before the forming. A compact density after the forming may preferably be 2.5 to 3.5 g/cm$^3$.

The sintering may preferably be performed in the air, a reducing atmosphere, or an inert gas atmosphere having a low oxygen concentration at a sintering temperature of 1250° C. to 1380° C. for a sintering time of 2 to 6 hours. When the sintering temperature exceeds 1380° C., the jump characteristic is undesirably deteriorated due to a homogenized Bi concentration inside a crystal grain with a sintering time exceeding 4 hours. Even in the case where the sintering temperature is from 1250° C. to 1380° C., the Bi concentration inside the crystal grain is homogenized to undesirably deteriorate the jump characteristic when the sintering time exceeds 8 hours. Further, the jump characteristic is undesirably deteriorated by the homogenization of Bi concentration inside crystal grain when a temperature increase rate before reaching the sintering temperature or a temperature reduction rate from the sintering temperature is 50° C./hr or less.

A more preferred sintering step is such that, at a temperature of 1290° C. to 1350° C. and in an atmosphere of 1% or less of an oxygen concentration, (1) sintering is performed in a sintering time of less than 4 hours or (2) sintering performed in a sintering time satisfying an expression: $\Delta T \geq 25t$ (wherein t denotes sintering time (hr), and $\Delta T$ denotes cooling rate (° C./hr) after sintering), followed by cooling after the sintering at a cooling rate satisfying the above expression. According to the preferred sintering step, it is possible to obtain a semiconductor ceramic composition that is improved in temperature coefficient of resistivity at a high temperature region (higher than the Curie temperature) while maintaining low room temperature resistivity.

It is possible to vary a composition in a crystal grain and a state of a crystal grain boundary by adjusting the production methods and the production conditions (a) to (c) described above, whereby it is possible to change the amount of shot key barrier formation to thereby control room temperature resistivity.

Although (a) to (c) have been described as examples of the production method for obtaining the semiconductor ceramic composition according to this invention, it is possible to employ a method including (a) to (c) in combination. Also, any methods other than the production methods (a) to (c) may be employed without particular limitation insofar as the method enables to obtain a crystal having a crystal grain of which the composition is partially varied.

EXAMPLES

Example 1

Raw material powders of BaCO$_3$, TiO$_2$, and La$_2$O$_3$ were so blended as to satisfy (Ba$_{0.994}$La$_{0.006}$)TiO$_3$, followed by mixing with a pure water. The mixed raw material powder thus obtained was calcined in the atmosphere at 1000° C. for 4 hours to prepare a (BaLa)TiO$_3$ calcined powder.

Raw material powders of $Na_2CO_3$, $Bi_2O_3$, and $TiO_2$ were so blended as to satisfy $(Bi_{0.5}Na_{0.5})TiO_3$, followed by mixing in ethanol. The mixed raw material powder thus obtained was calcined in the atmosphere at 800° C. for 2 hours to obtain a $(BiNa)TiO_3$ calcined powder.

The $(BaLa)TiO_3$ calcined powder and $(BiNa)TiO_3$ calcined powder thus prepared were blended so as to satisfy a target composition after sintering of $[(Bi_{0.5}Na_{0.5})_{0.08}(Ba_{0.994}La_{0.006})_{0.92}]TiO_3$, followed by mixing and crushing in a pot mill by using a pure water as a medium until the mixed calcined powder becomes 0.9 μm, and the mixed calcined powder was then dried. PVA was added to the crushed powder of the mixed calcined powder, followed by mixing, and the mixture was granulated by using a granulator. The granulated powder thus obtained was formed by using a uniaxial pressing machine, and a binder was eliminated from the compact at 700° C., followed by sintering at a sintering temperature of 1290° C. to 1380° C. for 1 to 10 hours, thereby obtaining sintered materials.

Test pieces were obtained by processing each of the thus-obtained sintered materials into a plate having the size of 10 mm×10 mm×1 mm, and a temperature change of a resistivity value from a room temperature to 270° C. of each of the test pieces was measured by using a resistivity meter. The measurement results are shown in sample numbers 1 to 5 and 7 to 12 of Table 1. A Bi concentration and a Na concentration in a crystal grain of each of the sintered materials were measured by employing energy dispersive X-ray spectroscopy using an energy dispersive X-ray spectroscopy transmission electron microscope. Measurement positions were an outer shell part composition at a part where a crystal grain B is bound to a crystal grain A and a central part composition in the vicinity of a central part of the crystal grain B as shown in FIG. 1. The measurement results are shown in sample numbers of 1 to 5 and 7 to 12 of Table 2. In Table 1 and Table 2, the sample number with * means that the sample is a comparative example. The sample number 7 was obtained by setting each of a temperature increase rate to the sintering and a temperature reduction rate from the sintering to 25° C./hr. In all of Examples, a temperature coefficient of resistivity was obtained by the following expression: $\alpha=(lnR_1-lnR_c)\times100/(T_1-T_c)$, wherein $R_1$ is maximum resistivity, $R_c$ is resistivity in $T_c$, $T_1$ is a temperature indicating $R_1$, and $T_c$ is the Curie temperature.

Example 2

$BaCO_3$, $TiO_2$, $La_2O_3$, $Bi_2O_3$, $Na_2CO_3$ were so blended as to satisfy $[(Bi_{0.5}Na_{0.5})_{0.08}(Ba_{0.994}La_{0.006})_{0.92}]TiO_3$, followed by mixing in ethanol. The mixed raw material powder thus obtained was calcined in the atmosphere at 1000° C. for 4 hours to obtain a calcined powder. The calcined powder thus obtained was mixed and crushed in a pot mill by using a pure water as a medium until the mixed calcined powder becomes 0.9 μm in a particle size, followed by drying. PVA was added to the crushed powder of the mixed calcined powder, followed by mixing, and the mixture was granulated by using a granulator. The granulated powder thus obtained was formed by using a uniaxial pressing machine, and a binder was eliminated from the compact at 700° C., followed by sintering at a sintering temperature of 1320° C. for 1 hour, thereby obtaining a sintered material. The sintered material thus obtained was processed in the same manner as in Example 1 and measurements were conducted under the same conditions. The measurement results are shown as sample number 6 in Table 1 and Table 2.

As is apparent from the measurement results of Table 1 and Table 2, the semiconductor ceramic compositions (sample numbers 1 to 5) according to this invention obtained in Example 1 by separately preparing the $(BaLa)TiO_3$ calcined powder and the $(BiNa)TiO_3$ calcined powder, followed by mixing, forming, and sintering at the preferred conditions and the semiconductor ceramic composition (sample number 6) according to this invention obtained in Example 2 by blending all of the elements forming the composition at the beginning as in the conventional example, followed by mixing, calcining, crushing, and forming, and then sintering the compact by the sintering time that is shorter than the conventional sintering time have the crystal grain in which the central part and the outer shell part have the different Bi—Na concentrations and the different ratios between Bi and Na, are reduced in room temperature resistivity (ρ30), and are improved in jump characteristic (temperature coefficient of resistivity). Further, it is revealed that the room temperature resistivity is controlled by the sintering conditions.

In contrast, sample numbers 7 to 12 that are comparative examples were obtained by performing steps to the sintering in the same manner as in sample numbers 1 to 5 of Example 1 while the temperature increase rate to the sintering and the temperature reduction rate from the sintering is slow or the sintering temperature is high or the sintering time is long. These semiconductor ceramic compositions have a homogenized Bi concentration in the crystal grain and are reduced in jump characteristic.

Example 3

A $(BaLa)TiO_3$ calcined powder and a $(BiNa)TiO_3$ calcined powder were prepared in the same manner as in Example 1. The $(BaLa)TiO_3$ calcined powder and the $(BiNa)TiO_3$ calcined powder were so blended as to satisfy $[(Bi_{0.5}Na_{0.5})_{0.08}(Ba_{0.994}La_{0.006})_{0.92}]TiO_3$, followed by further adding 1 mol % of $Bi_2O_3$, and then the mixed calcined powder was mixed and crushed in a pot mill by using a pure water as a medium until the mixed calcined power becomes 0.9 μm in a particle size, further followed by drying. PVA was added to the crushed powder of the mixed calcined powder, followed by mixing, and the mixture was granulated by using a granulator. The granulated powder thus obtained was formed by using a uniaxial pressing machine, and a binder was eliminated from the compact at 700° C., followed by sintering at a sintering temperature of 1320° C. for 1 to 4 hours, thereby obtaining sintered materials. The sintered materials thus obtained were processed in the same manner as in Example 1 and measurements were conducted under the same conditions. The measurement results are shown as sample numbers 13 and 14 in Table 3 and Table 4. In Table 3 and Table 4, the sample number with * means that the sample is a comparative example. The sample number 17 was obtained by adding 5.0 mol % of $Bi_2O_3$.

Example 4

Calcined powders were prepared in the same manner as in Example 2. To the calcined powders thus obtained, 1 mol % of $Bi_2O_3$ was added and then the mixed calcined powder was mixed and crushed in a pot mill by using a pure water as a medium until the mixed calcined power becomes 0.9 μm in a particle size, followed by drying. PVA was added to the crushed powder of the calcined powder, followed by mixing, and the mixture was granulated by using a granulator. The granulated powder thus obtained was formed by using a uniaxial pressing machine, and a binder was eliminated from the compact at 700° C., followed by sintering at a sintering temperature of 1320° C. for 4 hours, thereby obtaining a sintered material. The sintered material thus obtained was processed in the same manner as in Example 1 and measurements were conducted under the same conditions. The measurement results are shown as a sample number 15 in Table 3 and Table 4.

Example 5

A (BaLa)TiO$_3$ calcined powder and a (BiNa)TiO$_3$ calcined powder were prepared in the same manner as in Example 1. The (BaLa)TiO$_3$ calcined powder and the (BiNa)TiO$_3$ calcined powder were so blended as to satisfy [(Bi$_{0.5}$Na$_{0.5}$)$_{0.08}$(Ba$_{0.994}$La$_{0.006}$)$_{0.92}$]TiO$_3$, followed by further adding 1 mol % of Na$_2$CO$_3$, and then the mixed calcined powder was mixed and crushed in a pot mill by using ethanol as a medium until the mixed calcined power becomes 0.9 μm in a particle size, further followed by drying. PVA was added to the crushed powder of the mixed calcined powder, followed by mixing, and the mixture was granulated by using a granulator. The granulated powder thus obtained was formed by using a uniaxial pressing machine, and a binder was eliminated from the compact at 700° C., followed by sintering at a sintering temperature of 1320° C. for 1 to 4 hours, thereby obtaining sintered materials. The sintered materials thus obtained were processed in the same manner as in Example 1 and measurements were conducted under the same conditions. The measurement results are shown as sample numbers 18 and 19 in Table 5 and Table 6. In Table 5 and Table 6, the sample number with * means that the sample is a comparative example.

As is apparent from the measurement results of Table 3 to Table 6, the semiconductor ceramic compositions (sample numbers 13, 14, 15, 18, and 19) according to this invention obtained in Examples 3 to 5 by adding Bi or Na to the calcined powder, followed by mixing, forming, and sintering at the preferred conditions have the crystal grain in which the central part and the outer shell part have the different Bi—Na concentrations and the different ratios between Bi and Na, are reduced in room temperature resistivity (ρ30), and are improved in jump characteristic (temperature coefficient of resistivity).

In contrast, although the sample numbers 16 and 17 and the sample number 20 were obtained by adding Bi$_2$O$_3$ or Na$_2$CO$_3$ to the calcined material in the same manner as in sample numbers 13 and 14 of Example 3 and the sample number 18 and 19 of Example 5, respectively, the Bi concentration in the crystal grain is homogenized and the jump characteristic is deteriorated due to the prolonged sintering time. Further, the sample number 17 that was obtained by adding the excessive amount of Bi$_2$O$_3$ (5 mol %) is considered to have generated a secondary phase during the calcining, resulting in remarkably increased room temperature resistivity.

Example 6

Figure 2:
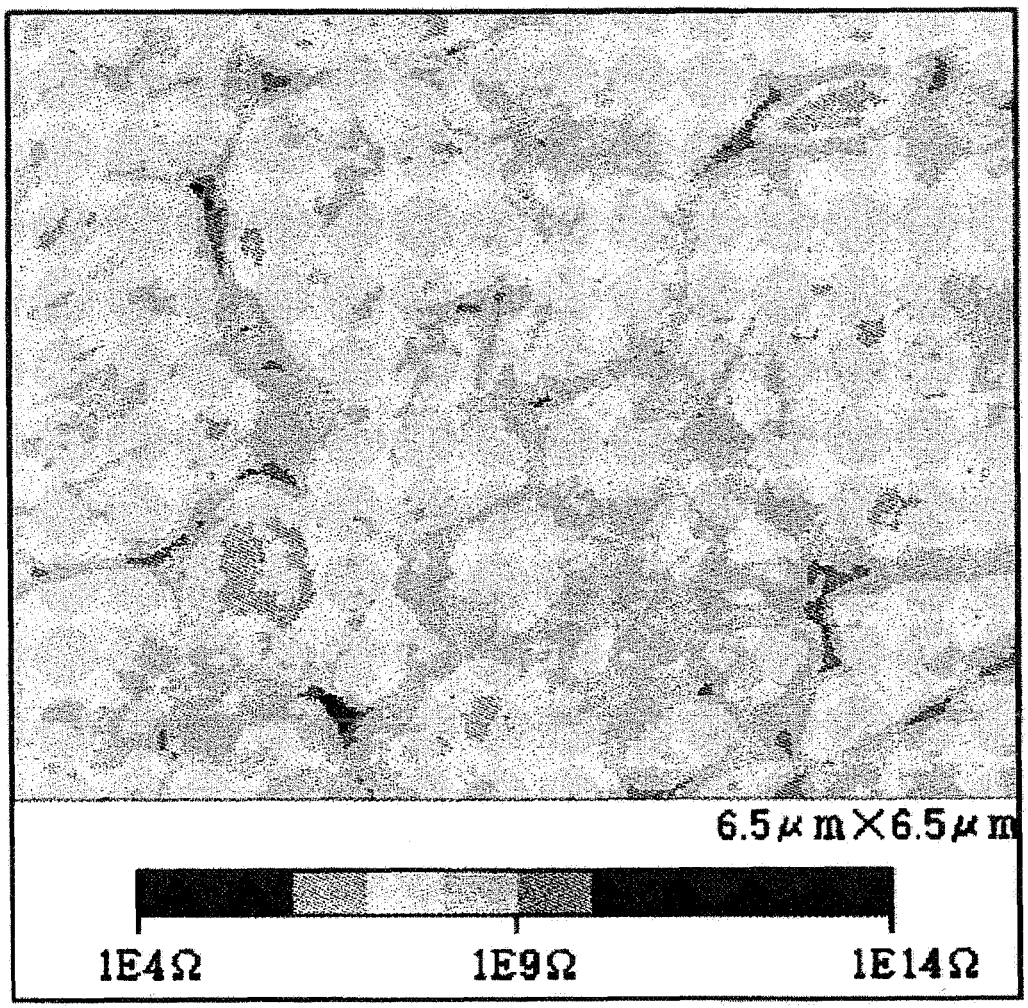
FIG. 2 is a diagram showing a result of observation of a semiconductor ceramic composition according to this invention by a scanning spreading resistivity microscope.
Figure 3:
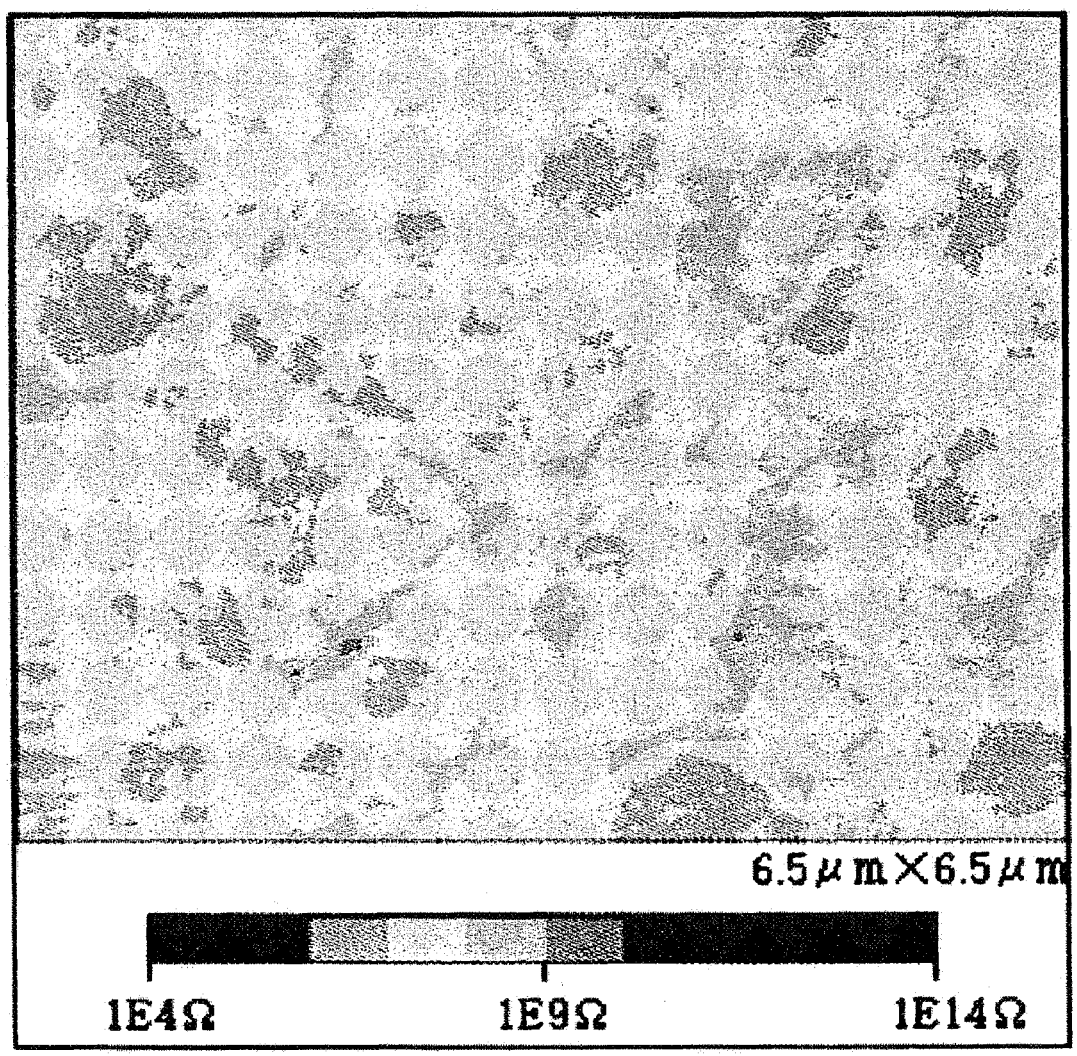
FIG. 3 is a diagram showing a result of observation of a semiconductor ceramic composition according to a comparative example by a scanning spreading resistivity microscope.

Results of the observation with a scanning spreading resistivity microscope of the semiconductor ceramic composition (sample number 6) according to this invention obtained by Example 1 and the semiconductor ceramic composition (sample number 10) that is the comparative example are shown in FIG. 2 and FIG. 3. FIG. 2 shows this invention, and FIG. 3 shows the comparative example. In FIG. 2 and FIG. 3, low resistivity is indicated by a portion having pale color; high resistivity is indicated by a portion having dark color; and the portion having black color means higher resistivity. The portion where a dark color is spread in a strip shape is the crystal grain boundary.

It is revealed that the crystal grain boundary of the semiconductor ceramic composition according to this invention that is shown in FIG. 2 has high resistivity. Further, there are a lot of black parts so that a lot of parts have higher resistivity. These high resistivity parts form the shot key barrier. That is, according to this invention, since the compositions of the outer shell part and the central part are different from each other in the crystal grain, a lot of shot key barriers are formed at the crystal grain boundaries that are formed by binding of the crystal grains. As a result, the jump characteristic is improved as shown in Table 1.

In contrast, the semiconductor ceramic composition of the comparative example shown in FIG. 3 has less crystal grain boundaries having high resistivity, and the black part is not found therein. That is, in the semiconductor ceramic composition shown in FIG. 3, an amount of shot key barrier formation is considerably small. Since the comparative example shown in FIG. 3 was obtained by sintering at 1320° C. for 10 hours, the compositions of the outer shell part and the central part in the crystal grain became uniform due to the prolonged sintering time, resulting in the reduction of the amount of shot key barrier formation at the crystal grain boundaries formed by binding of crystal grains.

Example 7

A (BaLa)TiO$_3$ calcined powder and a (BiNa)TiO$_3$ calcined powder were prepared in the same manner as in Example 1. The (BaLa)TiO$_3$ calcined powder and the (BiNa)TiO$_3$ calcined powder were so blended as to satisfy 0.75 (Ba$_{0.994}$La$_{0.006}$)TiO$_3$–0.25(Bi$_{0.5}$Na$_{0.5}$)TiO$_3$, and then the mixed calcined powder was mixed and crushed in a pot mill by using a pure water as a medium until the mixed calcined power becomes 0.9 μm in a particle size, followed by drying. PVA was added to the crushed powder of the mixed calcined powder, followed by mixing, and the mixture was granulated by using a granulator. The granulated powder thus obtained was molded by using a uniaxial pressing machine, and a binder was eliminated from the compact at 700° C., followed by sintering at sintering temperatures of 1290° C. or 1320° C. for 4 hours, thereby obtaining sintered materials. The sintered materials thus obtained were processed in the same manner as in Example 1 and measurements were conducted under the same conditions. The measurement results are shown as sample numbers 21 and 22 in Table 7 and Table 8.

As is apparent from Table 7 and Table 8, it is possible to improve the Curie temperature to about 220° C. by changing the blending ratio in blending the (BaLa)TiO$_3$ calcined powder and the (BiNa)TiO$_3$ calcined powder to 0.75 (Ba$_{0.994}$La$_{0.006}$)TiO$_3$–0.25(Bi$_{0.5}$Na$_{0.5}$)TiO$_3$, i.e. by increasing the ratio of (Bi$_{0.5}$Na$_{0.5}$)TiO$_3$. In the case where the Curie temperature is also changed, the central part and the outer shell part have different Bi—Na concentrations and different ratios between Bi and Na in the crystal grain, whereby the jump characteristic is improved.

Example 8

Raw material powders of BaCO$_3$, TiO$_2$, and La$_2$O$_3$ was blended so as to satisfy (Ba$_{0.994}$La$_{0.006}$)TiO$_3$, followed by mixing in a pure water. The mixed raw material powder thus obtained was calcined in the atmosphere at 1000° C. for 4 hours to prepare a (BaLa)TiO$_3$ calcined powder.

Raw material powders $NaCO_3$, $Bi_2O_3$, and $TiO_2$ was blended so as to satisfy $(Bi_{0.5}Na_{0.5})TiO_3$, followed by mixing in ethanol. The mixed raw material powder thus obtained was calcined in the atmosphere at 800° C. for 2 hours to prepare a (BiNa)$TiO_3$ calcined powder.

The (BaLa)$TiO_3$ calcined powder and (BiNa)$TiO_3$ calcined powder thus prepared were blended so as to satisfy $[(Bi_{0.5}Na_{0.5})_{0.08}(Ba_{0.994}La_{0.006})_{0.92}]TiO_3$, and then the mixed calcined powder was mixed and crushed in a pot mill by using a pure water as a medium until the mixed calcined power becomes 0.9 μm in a particle size, followed by drying. PVA was added to the crushed powder of the mixed calcined powder, followed by mixing, and the mixture was granulated by using a granulator. The granulated powder thus obtained was formed by using a uniaxial pressing machine, and a binder was eliminated from the compact at 700° C., followed by sintering at sintering temperatures of 1290° C. or 1320° C. for 4 hours, thereby obtaining sintered materials. The sintered materials thus obtained were processed in the same manner as in Example 1 and measurements were conducted under the same conditions. The measurement results are shown as sample numbers 23 and 24 in Table 9.

Figure 4:
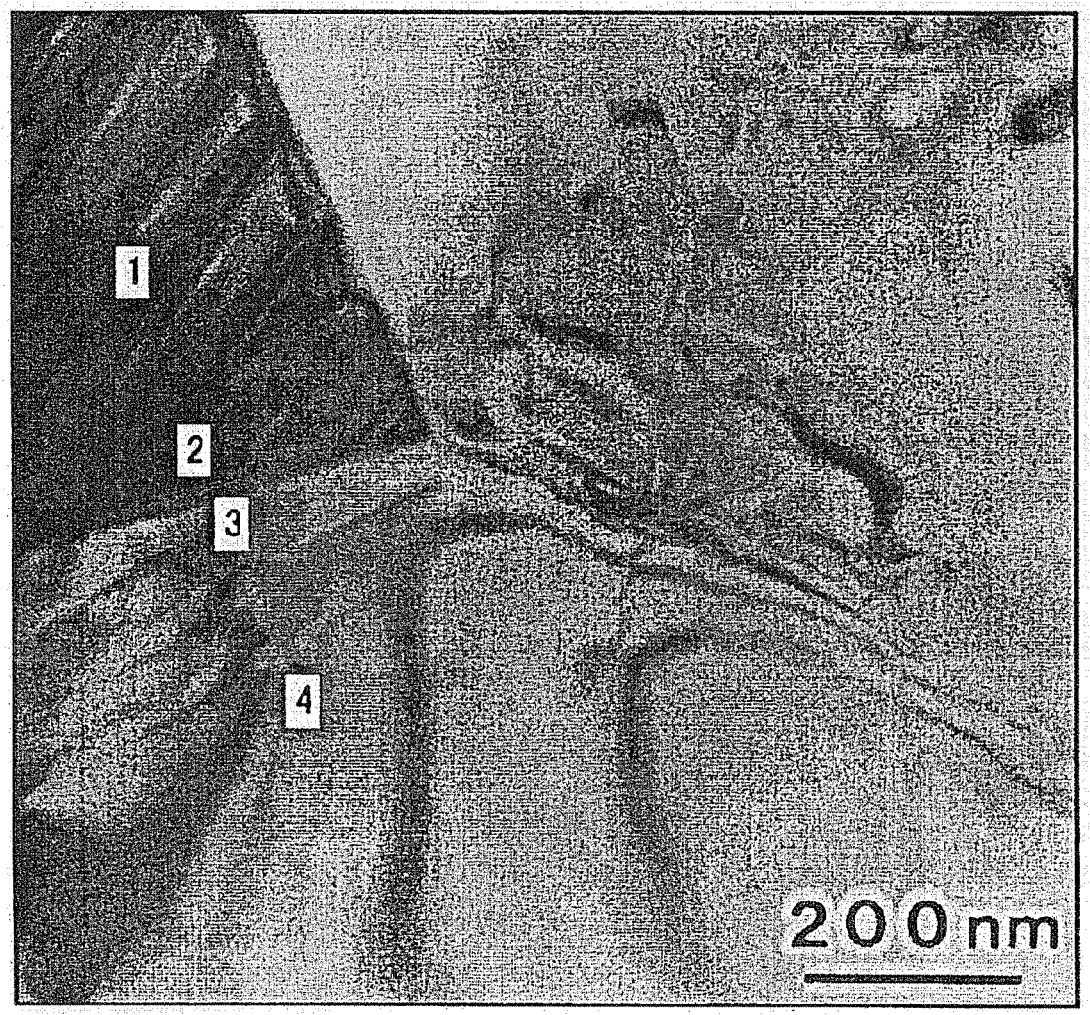
FIG. 4 is a diagram showing a composition measurement position of the semiconductor ceramic composition according to this invention.

Further, as show in FIG. 4, a Na concentration and a Bi concentration in each of a part close to the center of one of crystal grains (1 in FIG. 4), an outer shell part thereof (2 in FIG. 4), an outer shell part of the other crystal grain (3 in FIG. 4), and a part thereof close to the center (4 in FIG. 4) of the two crystal grains bound to each other via the crystal grain boundary were measured in the sintered material thus obtained. The measurement was conducted in the same manner as in Example 1 by employing energy dispersive X-ray spectroscopy using an energy dispersive X-ray spectroscopy transmission electron microscope. The measurement results are shown in Table 10. Although FIG. 4 shows the results of the sample number 24, measurements were conducted also on the sample number 23 by employing the same measurement method.

As shown in Table 10, the part close to the center and the outer shell part in each of the two crystal grains bound to each other via the crystal grain boundary have different Na concentrations and different Bi concentrations, and the Na concentrations and the Bi concentrations of the outer shell parts of the respective crystal grains bound via the crystal grain boundary differ from each other. Consequently, an amount of shot key formation at the crystal grain boundary is increased to improve a jump characteristic.

Example 9

Raw material powders of $BaCO_3$, $TiO_2$, and $La_2O_3$ were blended so as to satisfy $(Ba_{0.998}La_{0.002})TiO_3$, followed by mixing with a pure water. A (BaLa)$TiO_3$ calcined powder was prepared by calcining the mixed raw material powder thus obtained in the atmosphere at 1000° C. for 4 hours. Further, a (BiNa)$TiO_3$ calcined powder was prepared in the same manner as in Example 1. The (BaLa)$TiO_3$ calcined powder and (BiNa)$TiO_3$ calcined powder thus prepared were blended so as to satisfy $[(Bi_{0.5}Na_{0.5})_{0.08}(Ba_{0.998}La_{0.002})_{0.92}]TiO_3$, and then the mixed calcined powder was mixed and crushed in a pot mill by using a pure water as a medium, followed by drying. PVA was added to the crushed powder of the mixed calcined powder, followed by mixing, and the mixture was granulated by using a granulator. The granulated powder thus obtained was formed by using a uniaxial pressing machine, and a binder was eliminated from the compact at 700° C., followed by sintering at sintering temperatures of 1320° C. or 1350° C. for 4 hours, thereby obtaining sintered materials.

The sintered materials thus obtained were processed in the same manner as in Example 1 and measurements were conducted under the same conditions. The measurement results are shown as sample numbers 25 and 26 in Table 11 and Table 12.

In this Example, in order to approximate the composition to the composition of Patent Reference 1 mentioned above, the blending ratio in blending the (BaLa)$TiO_3$ calcined powder and the (BiNa)$TiO_3$ calcined powder to $[(Bi_{0.5}Na_{0.5})_{0.08}(Ba_{0.998}La_{0.002})_{0.92}]TiO_3$ by reducing the addition amount of La. In Patent Reference 1, all of the elements forming the composition are blended at the beginning, followed by mixing and drying, and then the mixture was calcined in the air or nitrogen at 850° C. to 1150° C. The calcined powder thus obtained is granulated and formed, followed by sintering in nitrogen at 1250° C. to 1380° C., and a heat treatment is performed in an oxidation atmosphere at 1100° C. to 1380° C. In patent Reference 1, in order to obtain the composition having the uniform composition, the high temperature sintering and the long time heat treatment are performed as has been performed in the art. Further, the heat treatment in the oxidation atmosphere in Patent Reference 1 is considered to be performed for the purpose of improving a jump characteristic through introduction of oxygen into a crystal grain boundary. Therefore, the compositions of the outer shell part and the central part in the crystal grain become uniform, and a shot key barrier formed at the crystal grain boundary by the Bi—Na concentration difference is small in amount, while achieving a barrier formed by the oxygen introduction.

In contrast, in Example 9, a crystal having crystal grain in which the outer shell part composition and the central part composition are different from each other is obtained by separately preparing the (BaLa)$TiO_3$ calcined powder and the (BiNa)$TiO_3$ calcined powder, followed by mixing, forming, and sintering. Therefore, a lot of shot key barriers are uniformly formed at the crystal grain boundary formed by the binding of crystal grains. Example 9 and the example of Patent Reference 1 are slightly different from each other in overall composition and are different from each other in semiconductive dopant ($Nd_2O_3$ in Patent Reference 1, while $La_2O_3$ in Example 9) and mechanism for shot key barrier formation. Therefore, the semiconductor ceramic composition according to Example 9 has the characteristic expression mechanism that is totally different from that of the porcelain composition of Patent Reference 1, and, although the jump characteristic is similar to that of Patent Reference 1 when converted into the same composition, the room temperature resistivity is greatly improved.

Further, as is apparent from Example 7 and Example 9, it is possible to obtain the crystal in which the crystal grain has the central part and the outer shell part having different Bi—Na concentrations and ratios between Bi and Na as well as to improve the jump characteristic. Thus, it is apparent that the semiconductor ceramic composition in which a portion of Ba of $BaTiO_3$ is substituted by Bi—Na is capable of practicing this invention.

Example 10

Figure 5:
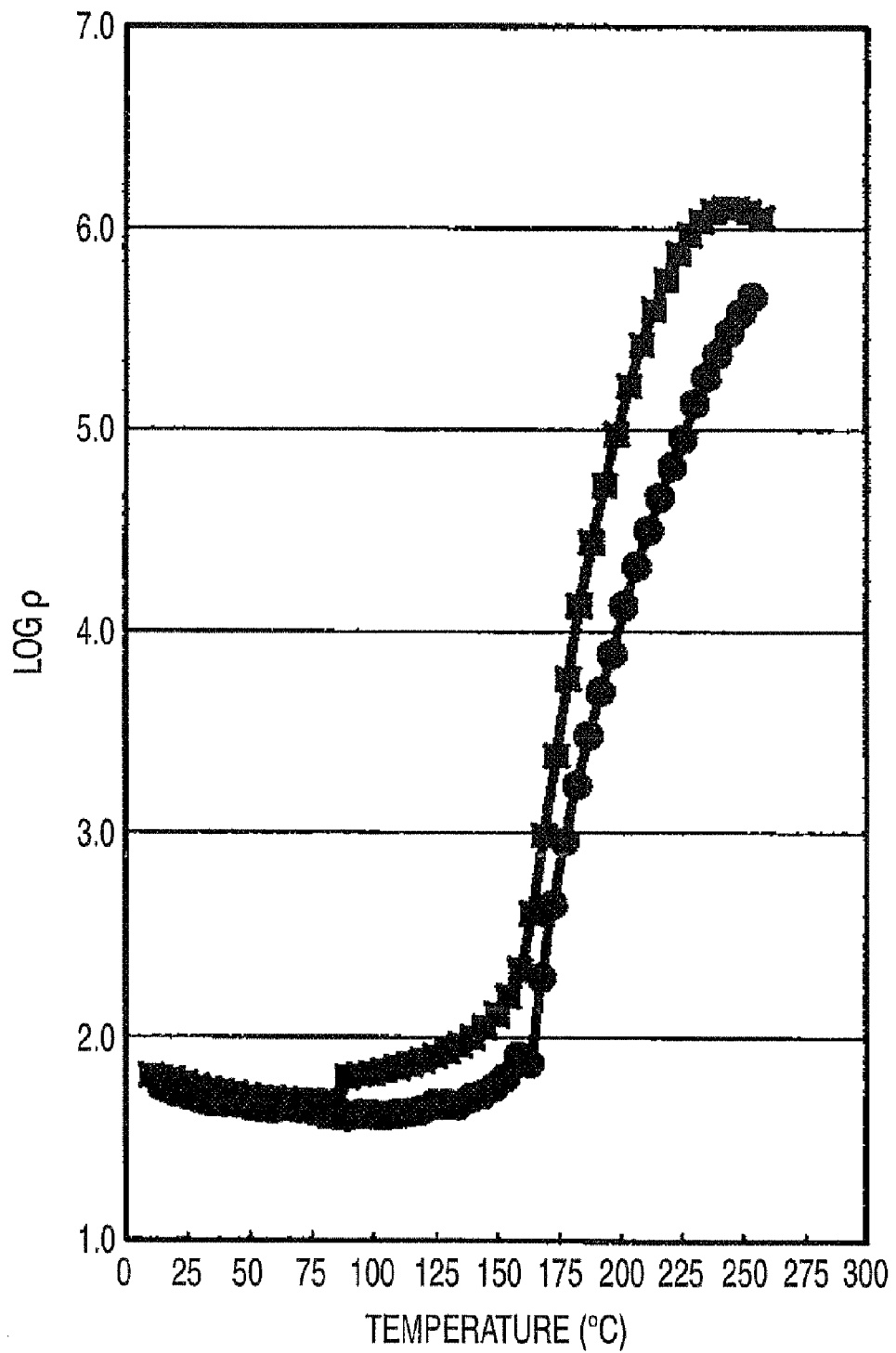
FIG. 5 is a diagram showing a relationship between a temperature and resistivity in each of the semiconductor ceramic composition according to this invention and conventional PTC element containing PbTiO3.

Shown in FIG. 5 are relationships between a temperature and resistivity of the semiconductor ceramic composition in which a portion of Ba of $BaTiO_3$ is substituted by Bi—Na, which does not contain Pb and has a crystal in which a crystal grain has a central part and an outer shell part varied in composition, and a conventional PTC element containing $PbTiO_3$. In FIG. 5, this invention is indicated by black dots, and the conventional example is indicated by black square.

A resistivity peak value of the conventional PTC element containing $PbTiO_3$ is in the vicinity of about 240° C. Electrical resistivity is reduced when the temperature exceeds 240° C. to raise possibility of thermorunaway. The thermorunaway is caused in such a manner that an increase in temperature causes a reduction in resistivity value to cause current leakage, and the temperature is further increased due to the current leakage to result in reduction in resistivity value. Fire can ultimately be caused when the temperature is raised too much. Since the semiconductor ceramic composition according to this invention has the peak value close to the high temperature side as compared to the conventional PTC element containing $PbTiO_3$, the semiconductor ceramic composition has the advantage of less causing thermorunaway.

TABLE 1

| Sample Number | Sintering Temperature (° C.) | Sintering Time (hr) | ρ30 (Ωcm) | Tc (° C.) | Temperature Coefficient of Resistivity |
|---|---|---|---|---|---|
| 1 | 1290 | 4 | 88.2 | 158 | 14.4 |
| 2 | 1320 | 1 | 81.7 | 157 | 13.6 |
| 3 | 1320 | 4 | 79.3 | 156 | 14.4 |
| 4 | 1350 | 1 | 78.4 | 156 | 14.2 |
| 5 | 1350 | 4 | 77.5 | 160 | 14.4 |
| 6 | 1320 | 1 | 73.3 | 157 | 14.8 |
| 7* | 1320 | 4 | 34.7 | 157 | 4.6 |
| 8* | 1320 | 8 | 99.4 | 152 | 10.5 |
| 9* | 1290 | 10 | 41.1 | 165 | 4.3 |
| 10* | 1320 | 10 | 34.9 | 166 | 4.2 |
| 11* | 1350 | 10 | 32.8 | 167 | 4.1 |
| 12* | 1380 | 4 | 31.9 | 170 | 3.9 |

TABLE 2

| | Outer Shell Part Composition in Crystal Grain | | Central Part Composition in Crystal Grain | |
|---|---|---|---|---|
| Sample Number | Na Concentration (mol %) | Bi Concentration (mol %) | Na Concentration (mol %) | Bi Concentration (mol %) |
| 1 | 2.05 | 3.14 | 0 | 0 |
| 2 | 3.06 | 1.94 | 0 | 0 |
| 3 | 2.94 | 1.44 | 0.69 | 0.44 |
| 4 | 2.95 | 1.36 | 0.57 | 0.28 |
| 5 | 2.83 | 2.14 | 0.43 | 0.11 |
| 6 | 2.74 | 1.23 | 0.55 | 0.34 |
| 7* | 2.77 | 3.23 | 1.53 | 2.54 |
| 8* | — | — | — | — |
| 9* | 2.95 | 3.02 | 1.87 | 3.08 |
| 10* | 3.54 | 3.34 | 0.11 | 3.48 |
| 11* | 1.11 | 2.94 | 1.83 | 3.26 |
| 12* | 2.11 | 2.96 | 1.53 | 3.06 |

TABLE 3

| Sample Number | Sintering Temperature (° C.) | Sintering Time (hr) | ρ30 (Ωcm) | Tc (° C.) | Temperature Coefficient of Resistivity |
|---|---|---|---|---|---|
| 13 | 1320 | 1 | 86.2 | 156 | 14.6 |
| 14 | 1320 | 4 | 85.1 | 157 | 14.6 |
| 15 | 1320 | 4 | 86.6 | 157 | 14.2 |
| 16* | 1320 | 10 | 31.3 | 171 | 3.9 |
| 17* | 1320 | 4 | 121.5 | 145 | 3.6 |

TABLE 4

| | Outer Shell Part Composition in Crystal Grain | | Central Part Composition in Crystal Grain | |
|---|---|---|---|---|
| Sample Number | Na Concentration (mol %) | Bi Concentration (mol %) | Na Concentration (mol %) | Bi Concentration (mol %) |
| 13 | 1.98 | 2.73 | 0.00 | 0.12 |
| 14 | 2.82 | 2.68 | 0.45 | 0.69 |
| 15 | 2.76 | 2.63 | 0.81 | 0.79 |
| 16* | 3.33 | 3.14 | 0.73 | 2.95 |
| 17* | 3.03 | 3.09 | 0.68 | 2.84 |

TABLE 5

| Sample Number | Sintering Temperature (° C.) | Sintering Time (hr) | ρ30 (Ωcm) | Tc (° C.) | Temperature Coefficient of Resistivity |
|---|---|---|---|---|---|
| 18 | 1320 | 1 | 91.2 | 161 | 13.5 |
| 19 | 1320 | 4 | 85.4 | 157 | 13.9 |
| 20* | 1320 | 10 | 33.1 | 174 | 4.7 |

TABLE 6

| | Outer Shell Part Composition in Crystal Grain | | Central Part Composition in Crystal Grain | |
|---|---|---|---|---|
| Sample Number | Na Concentration (mol %) | Bi Concentration (mol %) | Na Concentration (mol %) | Bi Concentration (mol %) |
| 18 | 2.49 | 0.61 | 0.34 | 0.17 |
| 19 | 3.12 | 1.26 | 1.32 | 0.45 |
| 20* | 3.31 | 3.03 | 2.05 | 3.05 |

TABLE 7

| Sample Number | Sintering Temperature (° C.) | Sintering Time (hr) | ρ30 (Ωcm) | Tc (° C.) | Temperature Coefficient of Resistivity |
|---|---|---|---|---|---|
| 21 | 1290 | 4 | 168.2 | 224 | 16.8 |
| 22 | 1320 | 4 | 128.7 | 218 | 15.6 |

TABLE 8

| | Outer Shell Part Composition in Crystal Grain | | Central Part Composition in Crystal Grain | |
|---|---|---|---|---|
| Sample Number | Na Concentration (mol %) | Bi Concentration (mol %) | Na Concentration (mol %) | Bi Concentration (mol %) |
| 21 | 4.29 | 4.04 | 1.01 | 0.67 |
| 22 | 4.22 | 3.97 | 1.11 | 0.71 |

TABLE 9

| Sample Number | Sintering Temperature (° C.) | Sintering Time (hr) | ρ30 (Ωcm) | Tc (° C.) | Temperature Coefficient of Resistivity |
|---|---|---|---|---|---|
| 23 | 1290 | 4 | 78.2 | 160 | 16.1 |
| 24 | 1320 | 4 | 67.6 | 159 | 15.4 |

TABLE 10

| Sample Number | Na Concentration at Each Points | | | | Na Concentration at Each Points | | | |
|---|---|---|---|---|---|---|---|---|
| | 1 | 2 | 3 | 4 | 1 | 2 | 3 | 4 |
| 23 | 0.31 | 1.87 | 2.31 | 0.56 | 0.59 | 2.88 | 1.01 | 0.77 |
| 24 | 0 | 1.48 | 1.85 | 0.69 | 0.45 | 1.60 | 2.24 | 0.44 |

TABLE 11

| Sample Number | Sintering Temperature (° C.) | Sintering Time (hr) | ρ30 (Ωcm) | Tc (° C.) | Temperature Coefficient of Resistivity |
|---|---|---|---|---|---|
| 25 | 1320 | 4 | 78.2 | 158 | 18.2 |
| 26 | 1350 | 4 | 66.6 | 169 | 17.3 |

TABLE 12

| Sample Number | Outer Shell Part Composition in Crystal Grain | | Central Part Composition in Crystal Grain | |
|---|---|---|---|---|
| | Na Concentration (mol %) | Bi Concentration (mol %) | Na Concentration (mol %) | Bi Concentration (mol %) |
| 25 | 2.89 | 3.04 | 1.66 | 1.05 |
| 26 | 2.22 | 2.75 | 1.81 | 1.03 |

INDUSTRIAL APPLICABILITY

The semiconductor ceramic composition according to this invention is optimum as a material for a PTC thermistor, a PTC heater, a PTC switch, a temperature detector, and the like.

The invention claimed is:

1. A $BaTiO_3$ semiconductor ceramic composition, in which a portion of the Ba of the $BaTiO_3$ is substituted by Bi—Na, the semiconductor ceramic composition containing crystal grains that each have an outer shell part disposed at the surface of the crystal grain and a central part disposed inside of the outer shell part, wherein the outer shell part and the central part in each crystal grain have different Bi concentrations and Na concentrations, and wherein the Bi concentration in the central part is about 1 mol % or less and the Bi concentration in the outer shell part is higher than the Bi concentration in the central part.

2. The semiconductor ceramic composition according to claim 1, wherein the Bi concentration in the outer shell part is higher than the Bi concentration in the central part, and the Bi concentration in the central part is about 1 mol % or less and the Bi concentration in the outer shell part is about 1 mol % or more.

3. The semiconductor ceramic composition according to claim 1, wherein both the Bi concentration and the —Na concentration increase from the central part to the outer shell part of each crystal grain.

4. The semiconductor ceramic composition according to claim 1, wherein the crystal grains having different Bi concentrations and Na concentrations in the outer shell parts are bound to each other at a crystal grain boundary.

5. The semiconductor ceramic composition according to claim 1, which is represented by a composition formula of $[(BiNa)_x(Ba_{1-y}R_y)_{1-x}]TiO_3$ (wherein R is at least one kind of rare earth elements), wherein x and y each satisfy $0<x\leqq0.2$ and $0<y\leqq0.02$.

6. The semiconductor ceramic composition according to claim 1, which is represented by a composition formula of $[(BiNa)_xBa_{1-x}][Ti_{1-z}M_z]O_3$ (wherein M is at least one kind of Nb, Ta, and Sb), wherein x and z each satisfy $0<x\leqq0.2$ and $0<z\leqq0.005$.

7. A $BaTiO_3$ semiconductor ceramic composition, in which a portion of the Ba of the $BaTiO_3$ is substituted by Bi—Na, the semiconductor ceramic composition containing crystal grains that each have an outer shell part disposed at the surface of the crystal grain and a central part disposed inside of the outer shell part, wherein the central part and the outer shell part of each crystal grain have different composition ratios of Bi concentration to Na concentration, and wherein the ratio of the Bi concentration in the outer shell part to the Bi concentration in the central part is 2.5 or more.

8. The semiconductor ceramic composition according to claim 7, wherein the crystal grains having different Bi concentrations and Na concentrations in the outer shell parts are bound to each other at a crystal grain boundary.

9. The semiconductor ceramic composition according to claim 7, which is represented by a composition formula of $[(BiNa)_x(Ba_{1-y}R_y)_{1-x}]TiO_3$, wherein:
R is at least one kind of rare earth element,
x satisfies the equation $0<x\leqq0.2$, and
y satisfies the equation $0<y\leqq0.02$.

10. The semiconductor ceramic composition according to claim 7, which is represented by a composition formula of $[(BiNa)_xBa_{1-x}][Ti_{1-z}M_z]O_3$, wherein:
M is at least one of Nb, Ta, and Sb,
x satisfies the equation $0<x\leqq0.2$, and
z satisfies the equation $0<z\leqq0.005$.

* * * * *